United States Patent [19]

Murakami

[11] Patent Number: 5,295,239
[45] Date of Patent: Mar. 15, 1994

[54] PRINTING COLOR CONTROL IN COLOR PRINTING APPARATUS

[75] Inventor: Yutaka Murakami, Yokohama, Japan
[73] Assignee: Canon Kabushiki Kaisha, Tokyo, Japan
[21] Appl. No.: 965,573
[22] Filed: Oct. 23, 1992

Related U.S. Application Data

[63] Continuation of Ser. No. 666,438, Mar. 11, 1991, abandoned, which is a continuation of Ser. No. 264,895, Oct. 31, 1988, abandoned.

[30] Foreign Application Priority Data

Nov. 5, 1987 [JP] Japan ................................ 62-278307

[51] Int. Cl.$^5$ .............................................. G06F 15/66
[52] U.S. Cl. ..................................... 395/151; 395/150; 395/110
[58] Field of Search ............... 395/162, 164, 129, 131, 395/150, 151; 340/703, 706, 747, 750

[56] References Cited

U.S. PATENT DOCUMENTS

| | | | |
|---|---|---|---|
| 4,723,217 | 2/1988 | Nakano et al. | 364/518 |
| 4,742,344 | 5/1988 | Nakagawa et al. | 340/723 |
| 4,763,118 | 8/1988 | Takai | 340/735 |
| 4,763,241 | 8/1988 | Egawa et al. | 346/154 |
| 4,771,275 | 9/1988 | Sanders | 340/703 |
| 4,800,510 | 1/1989 | Vinberg et al. | 364/521 |

*Primary Examiner*—Phu K. Nguyen
*Attorney, Agent, or Firm*—Fitzpatrick, Cella, Harper & Scinto

[57] ABSTRACT

A color printing apparatus for deciding a printing color in accordance with a character group has: memories to store character patterns of the colors corresponding to the character groups of each respective color; an input device to input character codes and a character group selection code; a selector to select a predetermined character group on the basis of a character group selection code; a deciding circuit to choose a predetermined one of the memories to store the character patterns in accordance with the character group selected by the selector; a character pattern memory to store the character pattern corresponding to the character code; a developing circuit to develop the character pattern read out of the character pattern memory into the predetermined memory chosen by the deciding circuit on the basis of the input character code; and a printer to print the character pattern developed by the developing means by the color corresponding to the memory. With this apparatus, color printing can be easily performed by a simple construction without need for a complicated color control.

24 Claims, 3 Drawing Sheets

PRINTING COLOR CONTROL IN COLOR PRINTING APPARATUS

This application is a continuation-in-part continuation of application Ser. No. 07/666,438, filed Mar. 11, 1991, now abandoned which is a continuation of application Ser. No. 07/264,895, filed Oct. 31, 1988, now abandoned.

BACKGROUND OF THE INVENTION

1. Field of the Invention

The present invention relates to a color printing apparatus and, more particularly, to a color printing apparatus which can determine printing color in accordance with a character group.

2. Related Background Art

In recent color printing apparatuses, color printing is generally performed on the basis of the following printing methods. For instance, (1) a color printing method of printing a pattern represented by a character code sandwiched between a "color print start command" and a "color print end command" in a designated color, (2) a color printing method of printing the inside of an area which is designated by a "color print area designation command" in a designated color, and the like can be mentioned.

In this manner, hitherto, a desired color image is formed by designating a predetermined color for a portion to be color printed.

Particularly, even in the case where a plurality of character groups which are classified in dependence on fonts or the like are stored in a predetermined ROM in a printing apparatus, color designation is performed on the basis of the foregoing color printing method (1), (2), or the like before printing.

However, since color designation in printing by one of the foregoing printing methods must always be performed there is the drawback that color control by means of color designation becomes complicated, in dependence on the amount of color designation, and the amount of data needed regarding the printing also increases extremely. On the other hand, there is also the drawback that the printing processing time becomes long with an increase in data amount.

SUMMARY OF THE INVENTION

It is the first object of the present invention to provide a color printing apparatus whose construction is simple and in which complicated color control is unnecessary.

The second object of the invention is to provide a color printing apparatus in which printing processing time is short.

DETAILED DESCRIPTION OF PREFERRED EMBODIMENT

The preferred embodiment according to the invention will be described in detail hereinbelow with reference to the drawings.

Figure 1:
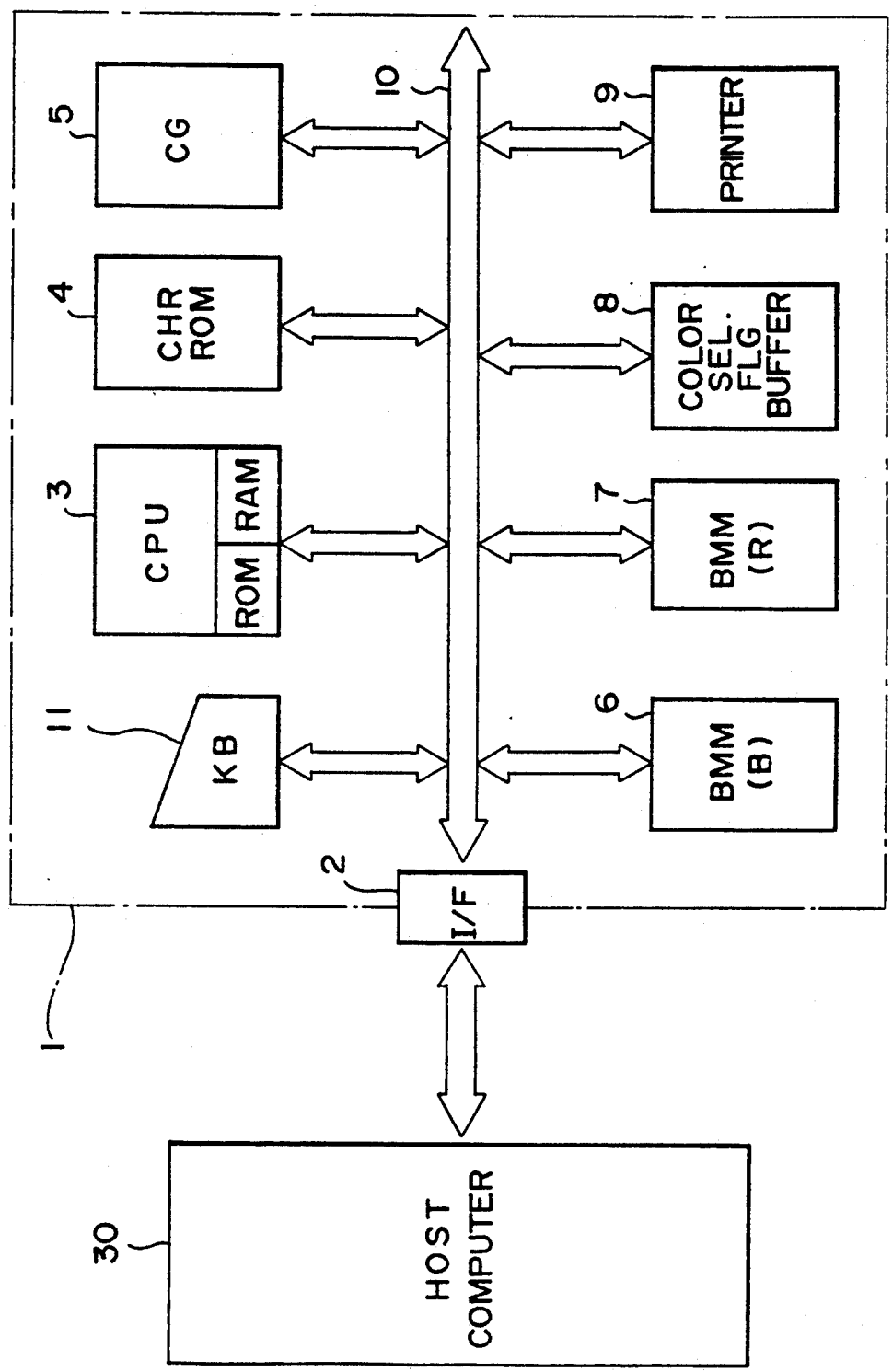
FIG. 1 is a block diagram showing an arrangement of a color printing apparatus according to an embodiment of the invention.

FIG. 1 is a block diagram showing an arrangement of a color printing apparatus as an embodiment of the invention. This apparatus performs color printing on the basis of image information (including character codes, control codes, and the like) which are sent from host computer 30. Although the embodiment relates to the apparatus for performing color printing on the basis of the image information which is sent from the host computer, the color printing can be also performed by a similar method on the basis of image information which is input by input means such as a keyboard or the like.

In the diagram, reference numeral 1 denotes a color printing apparatus; 2 is an interface unit to input and output signals by image information and the like in communication with the host computer 30; and 3 is a CPU to control the whole color printing apparatus 1. The CPU 3 has therein a ROM in which a control program, an error processing program, a processing program according to the flowchart of FIG. 3, and the like are stored and a RAM which functions as a working area during execution and a temporary shunting area during error processing.

Reference numeral 4 denotes a ROM for a character group, in which a character group to which character codes which are transmitted from the host computer 30 belong and a printing color for printing of the character group are stored in advance as a pair. The embodiment relates to an example of two-color printing, and the printing color is indicated by a color selection flag of having binary values of "1" and "0". Reference numeral 5 denotes a character generator (hereinafter, abbreviated to CG) for patterning the character code received from the host computer 30; 6 is a bit map memory (hereinafter, abbreviated to BMM) for blue (B) printing in which pattern data from the CG 5 is developed; and 7 is a BMM for red (R) printing in which pattern data from the CG 5 is developed in a manner similar to the BMM 6. Each of the BMM's 6 and 7 has a memory capacity of at least one page.

Reference numeral 8 denotes a color selection flag buffer to store the foregoing color selection flag to select the memory (BMM 6 or 7) into which pattern data from the CG 5 is developed upon printing; 9 is a printer to form a color image on a dot unit basis on recording paper on the basis of the pattern data developed in the BMM 6 or 7; 10 is a bus line; and 11 is a keyboard which can input information such as character codes and the like.

In the color printing apparatus 1 constructed as mentioned above, the content in the character group ROM 4 will now be described with reference to FIG. 2.

Figure 2:
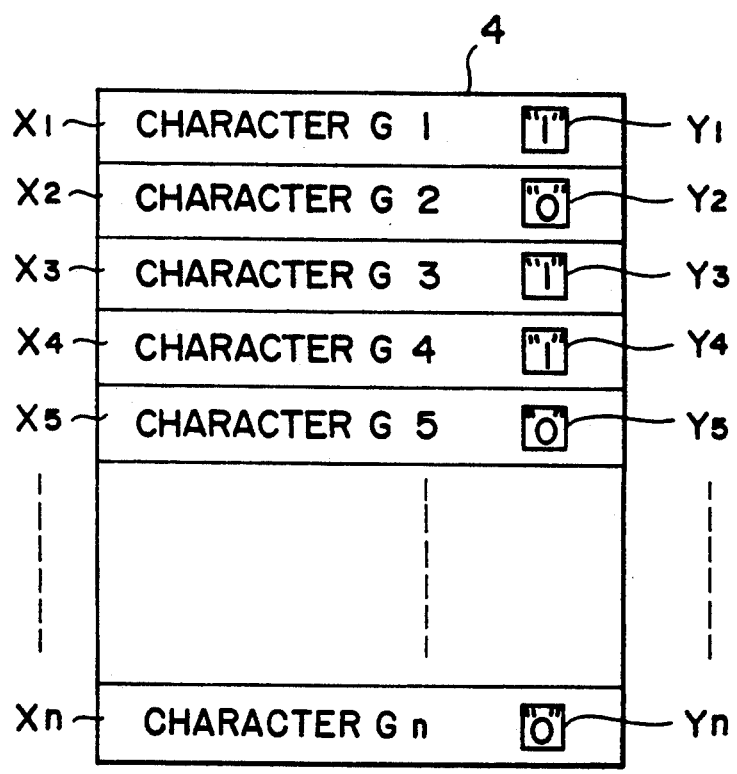
FIG. 2 is a diagram for explaining the content in a ROM for character group according to the embodiment of FIG. 1.

In FIG. 2, $X_1$ to $X_n$ indicate storage areas of character groups 1 to n and $Y_1$ to $Y_n$ represent color selection flag areas of the character groups 1 to n, respectively. When the color selection flag in the color selection flag area is set to "1", the printing color of the character group is set to red. When it is set to "0", the printing color of the character group is set to blue. For instance, the character groups 1, 3, and 4 are printed in printing red printing and the character groups 2, 5, and n are printed in blue.

As explained above, in this embodiment, the printing color corresponding to each character group is preset.

Figure 3:
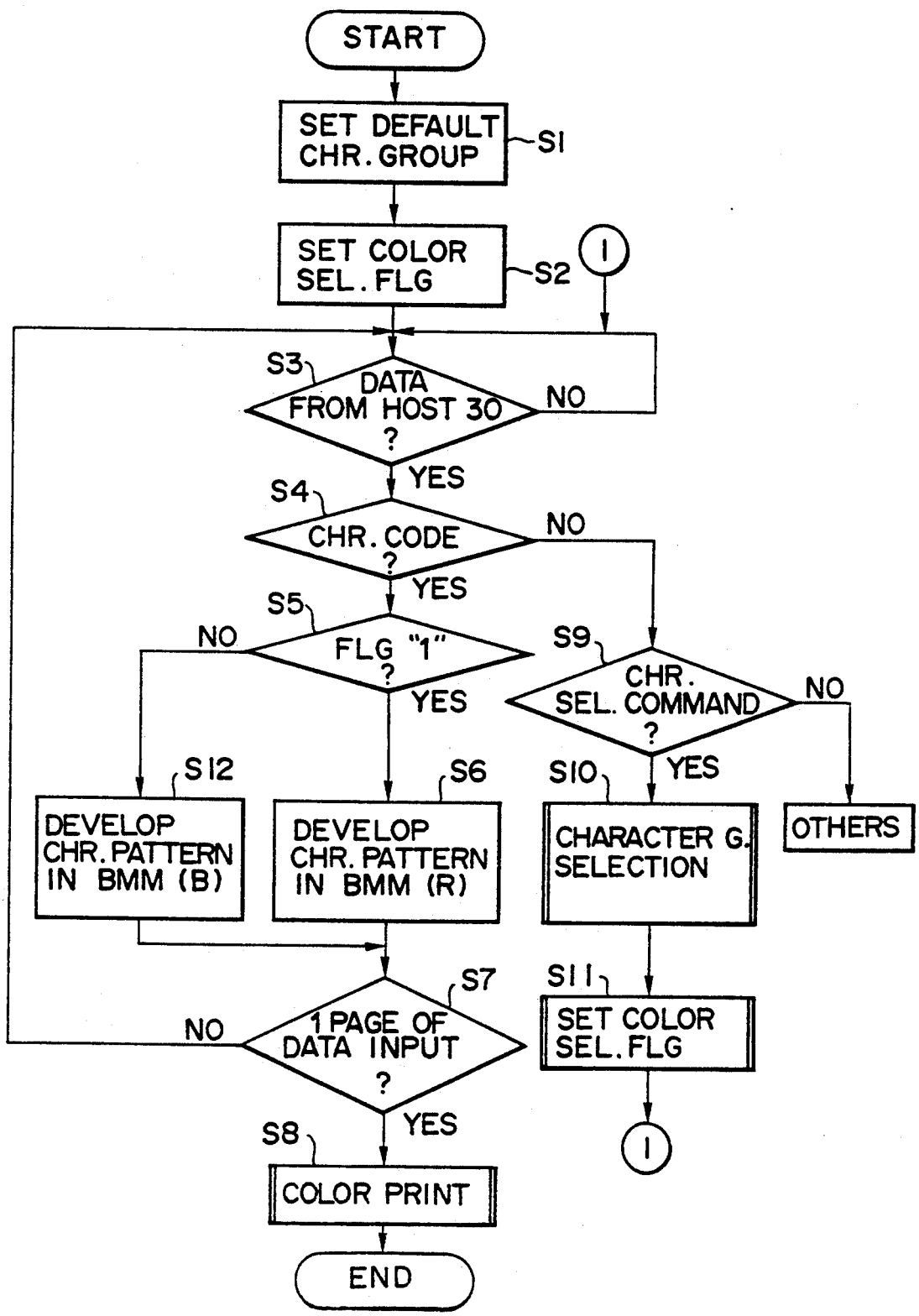
FIG. 3 is a flowchart for explaining the operation of the embodiment of FIG. 1.

The operation of the embodiment will now be described with reference to the flowchart of FIG. 3.

First, when the power supply of the color printing apparatus 1 is put on, various kinds of initializations are executed in the apparatus 1. At this time, for instance, one of default character groups for initialization is set from among the character groups 1 to n in FIG. 2 (step S1). In this embodiment, for example, the character group 1 assumes the value representing the default character group. This default character group 1 is set to a Ming type of ordinary characters in the preferred embodiments. The color selection flag "1" of the default character group 1 is set to the color selection flag buffer 8 (step S2). After completion of all of the initializations after the power supply has been put on, the apparatus waits until data is received from the host computer 30 (step S3).

Next, when data is received from the host computer 30, a check is made to see if this data is a character code or not (step S4). If YES, a check is made to see if the color selection flag which is set in the color selection flag buffer 8 is "1" or "0" (step S5). In this case, since "1" upon initialization has already been set in the buffer 8, the character code is patterned by the CG 5 and developed in the BMM (R) 7 (step S6). Until data of one page has been completely input in this manner, the processes in steps S3 to S6 are repeated (step S7). After the data of one page has completely been input, the color printing process is executed in red (step S8).

If the data received from the host computer 30 is not a character code but a character group selection command (steps S3, S4 and S5), a control code, indicative of one of the character groups 2 to n, is first detected from the character group selection command and the detected character group is selected (step S10). For instance, it is now assumed that the selected character group is a character group 2, comprising, e.g., the character group of Gothic type, other than the default character group 1. The color selection flag "0" of the character group 2 is set in the color selection flag buffer 8 (step S11). In a manner similar to the case of the default character group 1, the character codes of one page are received and the color printing process is executed for that page. However, since the color selection flag of the character group 2 is set to "0", the character pattern is developed in the BMM (B) 6 (step S12) and the blue color printing process is executed.

On the other hand, if the data received from the host computer 30 does not relate to either the character code or the character group selection command, an error process or the like is executed (indicated by the box labeled "other").

According to the above-described embodiment, by adding in advance one color to the character group and storing, when the character group to which the characters received from the host computer belong is detected, the printing color suitable for this character group can be automatically determined.

One the other hand, the BMM is not limited to a memory of one page but, e.g., a BMM for storing character patterns of a few lines can be also used.

First to fourth modifications of the embodiment will now be sequentially explained hereinbelow.

First Modification

The ROM for character groups in the embodiment can be also loaded as a RAM for character groups from the host computer side. On the other hand, a ROM cartridge for character groups of the detachable cartridge type can be also used.

Second Modification

The printing colors in the embodiment are not limited to two colors, but the number of BMM's can be further increased. For instance, to provide four BMM's, the memory in the color flag buffer is modified from one bit to two bits, or the like.

Third Modification

It is also obviously possible to modify the character group selection command in the embodiment and to enable the color printing to be performed by control codes including the area designation of a part of a plurality of input character codes and the color designation of this area. Further, in the case where a color selection flag to designate an area is provided for a character group including characters in the designated area and, at the same time, a color selection flag buffer to designate an area is provided, and a character group is used for area designation, and by performing the pattern development in the BMM so as to determine the printing color on the basis of the selection flag for area designation mentioned above, color printing can be efficiently realized without need for a complicated data construction due to the color designation.

Fourth Modification

The "character group" in the embodiment is a series of characters and can be further divided into smaller sets of characters. A printing color can be also assigned to each of these small sets of the character groups. An example of this method will now be explained hereinbelow.

When explaining an example of the ASCII code series, the character group can be divided into small sets by codes. That is, if codes "20" to "2F" (the codes are expressed by hexadecimal notation) are set to blue, codes "30" to "39" are set to black, and codes "3A" to "3F" are set to blue, respectively, in the printing mode, the character codes within a range of the codes from "30" to "39" are printed in black and the other character codes are printed in blue. Such a dividing process by the codes will now be explained by using practical characters. In the case where the codes "30" to "39" correspond to numerals "0" to "9" (numerals are expressed by decimal notation) and the character codes corresponding to the codes "30" to "39" are received from the host computer, the numerals corresponding to the received codes can be printed in black upon printing.

By further dividing the character group used in the foregoing embodiment into smaller sets as mentioned above, colors can be finely assigned every smaller set and the multicolor printing can be realized in accordance with the application use. Each of the small sets obtained by dividing the character group can be also used as one character group, respectively.

From the above description, the invention can realize the color printing by the efficient simple control.

What is claimed is:

1. A color printing apparatus comprising:
   first input means for inputting a plurality of pairs of color information and group information;
   memory means for storing the plurality of pairs of color information and group information input by said first input means;

second input means for inputting character data and group discrimination data;

character pattern memory means for storing character patterns corresponding to character data input by said second input means;

selection means for selecting one of the plurality of pairs of color information and group information stored in said memory means in response to the input group discrimination data; and color data setting means for setting color data for the character pattern stored in said character pattern memory means specified by the input group discrimination data, wherein the color data is set in response to the color information included in the one pair selected by said selection means.

2. A color printing apparatus according to claim 1, wherein the color data stored in said memory means comprises flag data.

3. A color printing apparatus according to claim 1, wherein the group data stored in said memory means comprises data for designating character style.

4. A color printing apparatus according to claim 1, further comprising means for inputting the color data.

5. A color printing apparatus according to claim 1, further comprising a plurality of memory means each of which comprises a bit map memory.

6. A color printing apparatus according to claim 1, further comprising control means that uses one of the plurality of group discrimination data for initialization of said apparatus.

7. A color printing method comprising the steps of:

inputting a plurality of pairs of color information and group information;

storing the plurality of pairs of color information and group information input in said inputting step;

inputting character data and group discrimination data;

storing, in character pattern memory means, character patterns corresponding to character data input in said character data inputting step;

selecting one of the plurality of pairs of color information and group information in response to the input group discrimination data; and setting color data for the character pattern stored in said character pattern storing step specified by the input group discrimination data, wherein the color data is set in response to the color information included in the one pair selected in said selecting step.

8. A color printing method according to claim 7, wherein the stored color data comprises flag data.

9. A color printing method according to claim 7, wherein the stored group data comprises data for designating character style.

10. A color printing method according to claim 7, further comprising the step of inputting the color data for storage.

11. A color printing method according to claim 7, wherein said color setting step is performed by storing the color data in a respective one of a plurality of memory means each of which comprises a bit map memory.

12. A color printing method according to claim 7, further comprising a controlling step, in which one of a plurality of character discrimination data is used for initialization.

13. A color printing apparatus to which a detachable external memory which stores a plurality of pairs of color information and group information is connected, said apparatus comprising:

input means for inputting character data and group discrimination data;

character pattern memory means for storing character patterns corresponding to character data input by said input means;

selection means for selecting one of a plurality of pairs of color information and group information stored in the external memory in response to the input group discrimination data; and color data setting means for setting color data for the character pattern stored in said character pattern memory means specified by the input group discrimination data, wherein the color data is set in response to the color information included in the one pair selected by said selection means.

14. A color printing apparatus according to claim 13, wherein the color data stored in said memory means comprises flag data.

15. A color printing apparatus according to claim 13, wherein the group data stored in said memory means comprises data for designating character style.

16. A color printing apparatus according to claim 13, further comprising means for inputting the color data.

17. A color printing apparatus according to claim 13, further comprising a plurality of memory means each of which comprises a bit map memory.

18. A color printing apparatus according to claim 13, further comprising control means that uses one of the plurality of group data for initialization of said apparatus.

19. A color printing method for use in a color printing apparatus to which a detachable external memory which stores a plurality of pairs of color information and group information is connected, said method comprising the steps of:

inputting character data and group discrimination data;

storing character patterns corresponding to character data input in said input step;

selecting one of a plurality of pairs of color information and group information stored in the external memory in response to the input group discrimination data; and setting color data for the character pattern stored in said storing step specified by the input group discrimination data, wherein the color data is set in response to the color information included in the one pair selected said selection step.

20. A color printing method according to claim 19, wherein the color data comprises flag data.

21. A color printing apparatus according to claim 19, wherein the group data comprises data for designating character style.

22. A color printing apparatus according to claim 19, further comprising the step of inputting the color data.

23. A color printing apparatus according to claim 19, wherein said setting step is performed by storing the color data in a respective one of a plurality of memory means each of which comprises a bit map memory.

24. A color printing apparatus according to claim 19, further comprising the step of using one of the plurality of group discrimination data for initialization.

* * * * *

UNITED STATES PATENT AND TRADEMARK OFFICE
CERTIFICATE OF CORRECTION

PATENT NO. : 5,295,239
DATED : March 15, 1994
INVENTOR(S) : YUTAKA MURAKAMI

It is certified that error appears in the above-identified patent and that said Letters Patent is hereby corrected as shown below:

COLUMN 1

Line 5, "continuation-in-part" should be deleted.
    Line 41, "formed" should read --formed,--.
    Line 64, "group" should read --groups--.

COLUMN 2

Line 25, "like" should read --like,--.
    Line 30, "group," should read --group--; and "group" should read --group,--.
    Line 32, "belong" should read --belong,--.
    Line 35, "of" should be deleted.
    Line 38, "CG)" should read --"CG")--.
    Line 40, "BMM)" should read --"BMM")--.
    Line 65, "printing" (both occurrences) should be deleted.

COLUMN 3

Line 12, "bodiments." should read --bodiment.--.
    Line 32, "S5)," should read --S9),--.

UNITED STATES PATENT AND TRADEMARK OFFICE
CERTIFICATE OF CORRECTION

PATENT NO. : 5,295,239
DATED : March 15, 1994
INVENTOR(S) : YUTAKA MURAKAMI

It is certified that error appears in the above-identified patent and that said Letters Patent is hereby corrected as shown below:

COLUMN 4

Line 45, "by" should be deleted.
Line 55, after "assigned" insert --for-- and change "smaller" to --small--.
Line 61, "the" (both occurrences) should be deleted.

Signed and Sealed this

Eleventh Day of October, 1994

Attest:

BRUCE LEHMAN

Attesting Officer    Commissioner of Patents and Trademarks